(12) United States Patent
van Oostrom

(10) Patent No.: US 11,019,691 B1
(45) Date of Patent: May 25, 2021

(54) GALLEY INSERT MULTI-PURPOSE LED SYSTEM

(71) Applicant: B/E Aerospace, Inc., Winston-Salem, NC (US)

(72) Inventor: Pieter van Oostrom, Haalderen (NL)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/745,666

(22) Filed: Jan. 17, 2020

(51) Int. Cl.
| | |
|---|---|
| *G08B 21/00* | (2006.01) |
| *H05B 45/20* | (2020.01) |
| *H05B 45/12* | (2020.01) |
| *H05B 47/11* | (2020.01) |
| *G08B 5/36* | (2006.01) |
| *B64D 11/04* | (2006.01) |
| *B60Q 3/47* | (2017.01) |
| *H05B 47/115* | (2020.01) |

(52) U.S. Cl.
CPC ............... *H05B 45/20* (2020.01); *B60Q 3/47* (2017.02); *B64D 11/04* (2013.01); *G08B 5/36* (2013.01); *H05B 45/12* (2020.01); *H05B 47/11* (2020.01); *H05B 47/115* (2020.01); *B64D 2203/00* (2013.01)

(58) Field of Classification Search
CPC ........ H05B 45/20; H05B 47/11; H05B 45/12; H05B 47/115; B64D 11/04; B64D 2203/00; G08B 5/36; B60Q 3/47; F25B 49/005; F25D 29/003; F25D 2700/02; F25D 2400/361

USPC .... 340/945, 953, 955, 693.5, 691.6, 815.45, 340/815.4; 62/180
See application file for complete search history.

(56) References Cited

U.S. PATENT DOCUMENTS

| | | | |
|---|---|---|---|
| 7,615,939 | B2 | 11/2009 | Halter |
| 7,765,818 | B2 * | 8/2010 | Buck ..................... F25B 49/005 62/180 |
| 10,112,716 | B2 | 10/2018 | Gagnon et al. |
| 10,118,701 | B2 | 11/2018 | Johannessen et al. |
| 10,202,194 | B2 | 2/2019 | Beckman |
| 10,227,126 | B2 | 3/2019 | Kircher et al. |
| 10,384,803 | B2 | 8/2019 | Hills et al. |
| 10,413,630 | B1 * | 9/2019 | Hsiao ..................... A61L 9/122 |
| 2005/0121978 | A1 * | 6/2005 | McAvoy .................. H02J 3/14 307/43 |
| 2006/0187081 | A1 | 8/2006 | Gloisten et al. |
| 2014/0049974 | A1 | 2/2014 | Daout et al. |

(Continued)

FOREIGN PATENT DOCUMENTS

| | | |
|---|---|---|
| GB | 2506380 A | 4/2014 |
| WO | 2018178908 A1 | 10/2018 |

*Primary Examiner* — Anh V La
(74) *Attorney, Agent, or Firm* — Suiter Swantz pc llo

(57) ABSTRACT

A galley appliance system includes an integrated light emitting diode (LED) strip to display operational data, detect certain states of the galley appliance, and alter the LED strip accordingly. The integrated LED strip illuminates the area adjacent to the galley appliance and the interior of the galley appliance when the galley appliance door is open. The LED strip provides customizable galley mood light when not otherwise occupied. Multiple appliances may be in data communication to provide galley wide mood lighting. The system may be in data communication with aircraft systems to provide environmental feedback via color coded illumination.

13 Claims, 7 Drawing Sheets

(56) References Cited

U.S. PATENT DOCUMENTS

| | | |
|---|---|---|
| 2014/0367517 A1 | 12/2014 | Eckel et al. |
| 2015/0151679 A1 | 6/2015 | Aruga et al. |
| 2016/0214529 A1 | 7/2016 | Valentine, Jr. et al. |
| 2017/0073075 A1* | 3/2017 | Gagnon .................. H05B 45/20 |
| 2017/0113813 A1* | 4/2017 | Heuer .................... G01C 9/005 |
| 2019/0092472 A1 | 3/2019 | Gehle et al. |

* cited by examiner

GALLEY INSERT MULTI-PURPOSE LED SYSTEM

BACKGROUND

Contemporary aircraft galleys are often poorly illuminated, and flight attendants work in their own shadows on the Galley work-deck. This generates some operational issues while in the galley and while trying to obtain feedback from the equipment at a distance.

Existing lighting system can illuminate the galley work area but may not be adjustable to specific appliance locations, and existing appliance lighting systems can illuminate the interior of the applicant but do not provide any feedback about the appliance.

SUMMARY

In one aspect, embodiments of the inventive concepts disclosed herein are directed to a galley appliance system with an integrated light emitting diode (LED) strip to display operational data, detect certain states of the galley appliance, and alter the LED strip accordingly. The integrated LED strip illuminates the area adjacent to the galley appliance and the interior of the galley appliance when the galley appliance door is open.

In a further aspect, the LED strip provides customizable galley mood light when not otherwise occupied. Multiple appliances may be in data communication to provide galley wide mood lighting. The system may be in data communication with aircraft systems to provide environmental feedback via color coded illumination.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
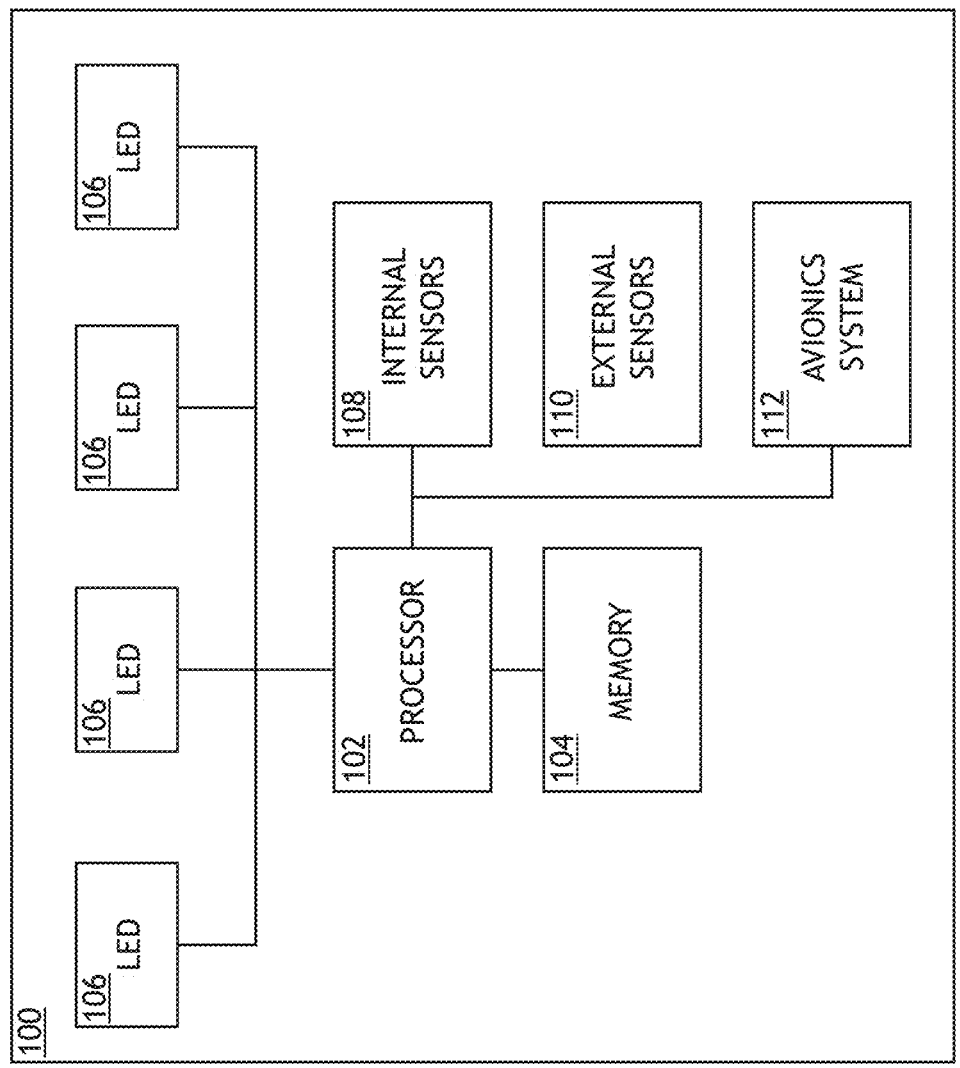
FIG. 1 shows a block diagram of a system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a galley appliance system with an integrated light emitting diode (LED) strip to display operational data, detect certain states of the galley appliance, and alter the LED strip accordingly. The integrated LED strip illuminates the area adjacent to the galley appliance and the interior of the galley appliance when the galley appliance door is open and provides customizable galley mood light when not otherwise occupied. Multiple appliances may be in data communication to provide galley wide mood lighting. The system may be in data communication with aircraft systems to provide environmental feedback via color coded illumination.

Referring to FIG. 1, a block diagram of a system 100 according to an exemplary embodiment is shown. The system 100, embodied in an aircraft galley appliance, includes a processor 102, memory 104 connected to the processor 102 for embodying processor executable code, and a plurality of color changing light emitting diodes (LEDs) 106. The processor 102 is configured to receive state data corresponding to the system; for example, where the system is embodied in an oven, the processor 102 may receive data indicating that a heating cycle has begun, that a cooking cycle has ended, that the oven has experienced a fault, that some flight attendant input is necessary, etc. Each unique system state is associated with a color code reproducible on the plurality of color changing LEDs 106.

In at least one embodiment, the processor 102 is in data communication with one or more internal sensors 108, such as a door sensor, light sensor, and/or proximity sensor incorporated into the galley appliance. The processor 102 may apply overriding illumination states to the plurality of color changing LEDs 106 based on the state of the internal sensors 108; for example, when a door sensor indicates the appliance door is open, the color changing LEDs 106 may be illuminated with white light to illuminate the interior of the galley appliance regardless of the current state of the system. Alternatively, or in addition, when a light sensor detects a low light state in the galley, the luminosity of the color changing LEDs 106 may be reduced for all states. Alternatively, or in addition, the color changing LEDs 106 may remain off until a proximity sensor detects the presence of a flight attendant.

In at least one embodiment, the processor 102 is in data communication with one or more external sensors 110. For example, rather than a light sensor internal to the galley appliance, the processor 102 may receive light level data from an external source. Alternatively, or in addition, the processor 102 may be in data communication with other galley appliances, also embodying a system 100 according to embodiments of the present disclosure, and utilizing sensors from one or more of those other galley appliances. In addition, the processor 102 may activate the color changing LEDs 106 to produce simple mood lighting when not otherwise in use. Multiple galley appliances may operate in concert via data communication to produce mood lighting of a similar color and luminosity.

In at least one embodiment, the processor 102 is in data communication with avionics systems 112 aboard the aircraft. In the even of warning state, the processor 102 may apply an appropriate warning state color to the color changing LEDs 106, regardless of the state of the system 100; for example, when the captain has indicated that all crew should be seated.

Figure 2:
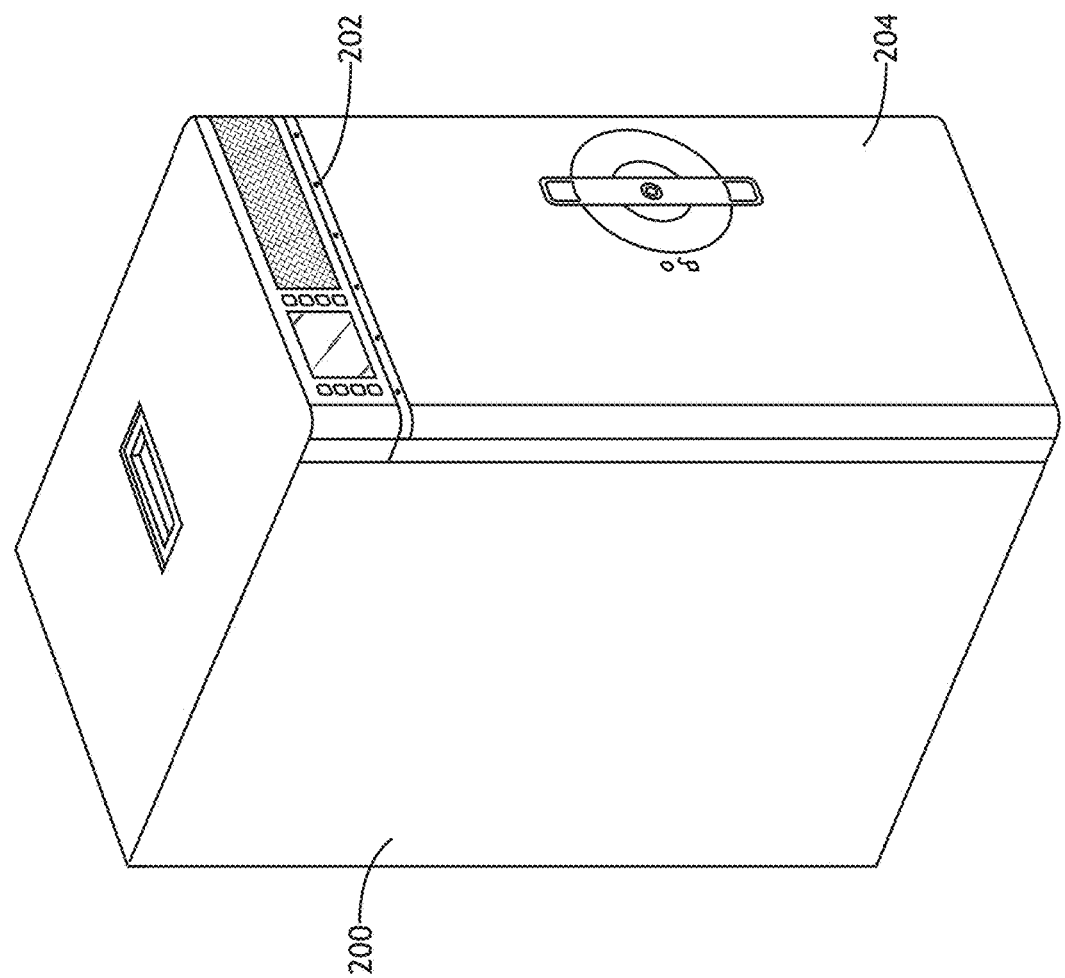
FIG. 2 shows a perspective view of an appliance according to an exemplary embodiment.

Referring to FIG. 2, a perspective view of an appliance 200 according to an exemplary embodiment is shown. The appliance 200 includes a plurality of color changing LEDs 202 disposed in the frame of the appliance 200, in proximity to a door 204. The color changing LEDs 202 are disposed to illuminate a front surface of the door 204 which provides a large, easily visible area where light may be diffusely reflected. Furthermore, disposition proximal to the door 204 allow the color changing LEDs 202 to illuminate the immediate work area and the interior of the appliance 200 when the door 204 is open.

Figure 3:
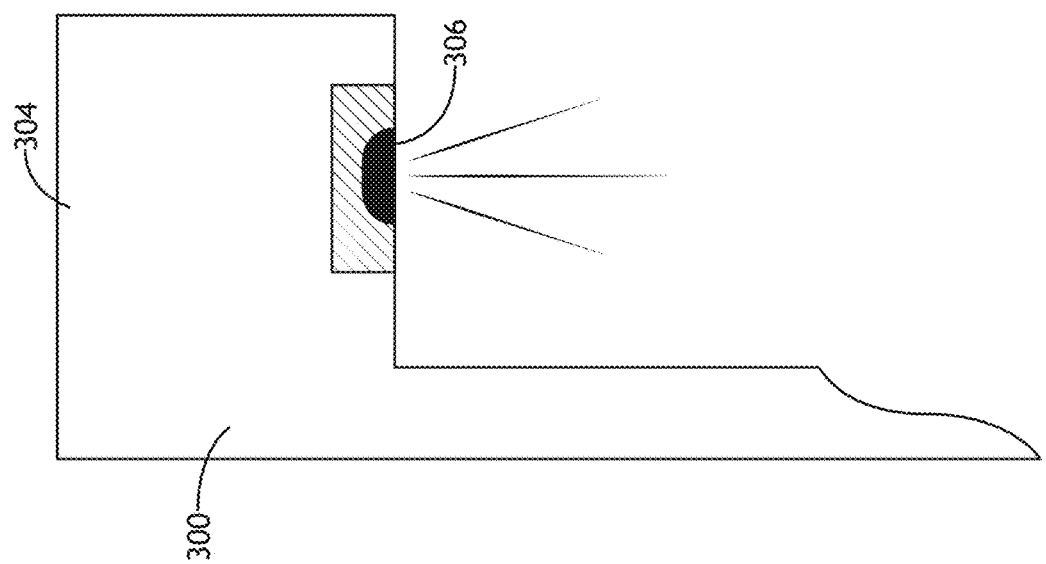
FIG. 3 shows a top view of an appliance according to an exemplary embodiment.

Referring to FIG. 3, a side view of an appliance 300 according to an exemplary embodiment is shown. The appliance 300 includes a plurality of color changing LEDs 306 disposed in an upper control panel 304 of the appliance 300. The disposition of the color changing LEDs 306, close to the work area and oriented downward with no obstructions, prevents any shadows from interfering with the crew and directs light generally downward.

Figure 4:
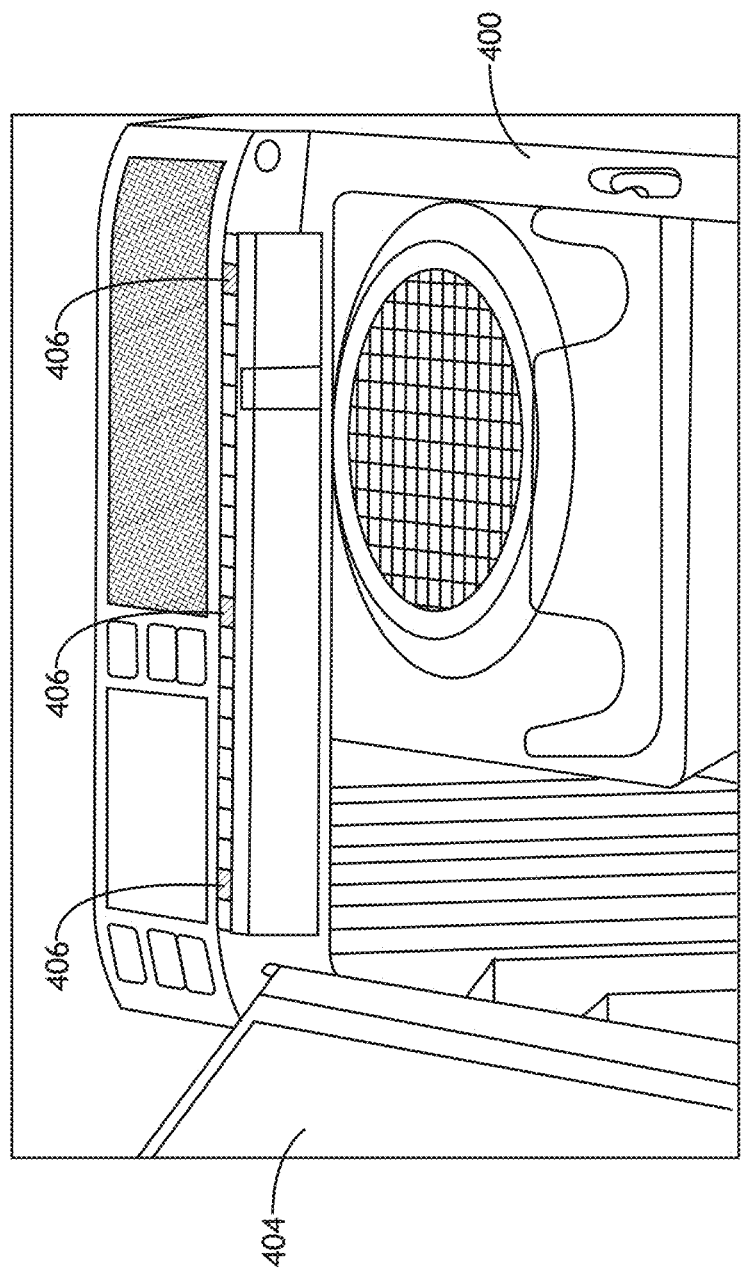
FIG. 4 shows a detail, partial view of an appliance according to an exemplary embodiment.

Referring to FIG. 4, a detail, partial view of an appliance according to an exemplary embodiment is shown. The appliance 400 includes a plurality of color changing LEDs 406 disposed in the frame of the appliance 400, in proximity to a door 404. The disposition of the color changing LEDs 406, in a bottom surface of an upper control panel, generally directs light from the color changing LEDs 406 downward toward the work area and interior of the appliance when the door 404 is open. Such disposition may prevent light from the color changing LEDs 406 from interfering with crew members in other parts of the galley.

Figure 5:
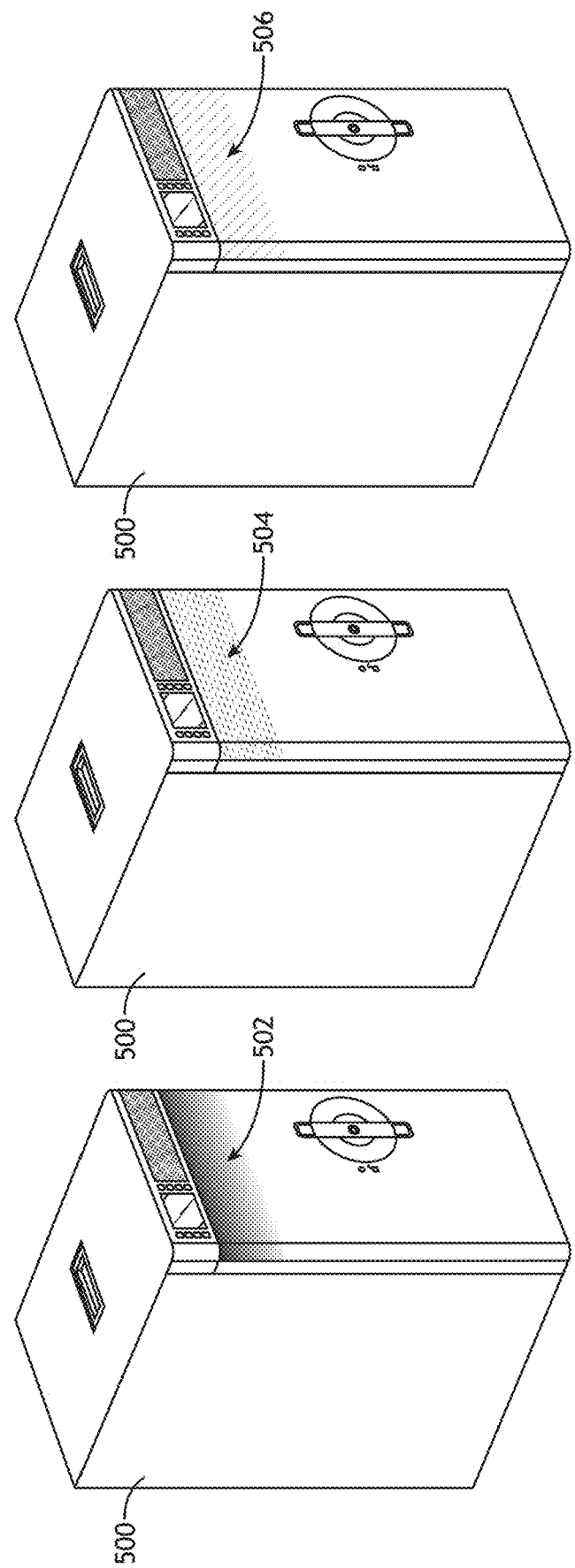
FIG. 5A shows a perspective view of an appliance according to an exemplary embodiment.
FIG. 5B shows a perspective view of an appliance according to an exemplary embodiment.
FIG. 5C shows a perspective view of an appliance according to an exemplary embodiment.

Referring to FIGS. 5A-5C, perspective views of an appliance 500 according to an exemplary embodiment is shown. In at least one embodiment, color changing LEDs disposed in the appliance are oriented to illuminate a door of the appliance 500 when closed and the interior of the appliance 500 when open. The color changing LEDs also illuminate the immediate work area. The color of the color changing LEDs may be defined by the operating state of the appliance 500; for example, the color changing LEDs may flash green 502 when the appliance 500 has a "ready" status, blue 504 when the appliance 500 is a busy status, amber 506 when the appliance 500 has a "fault" status, etc.

In at least one embodiment, the color changing LEDs may follow the on/off button light-ring colors operational modes (blue, amber, green etc.). It may appreciated that any combination of colors is contemplated.

Figure 6:
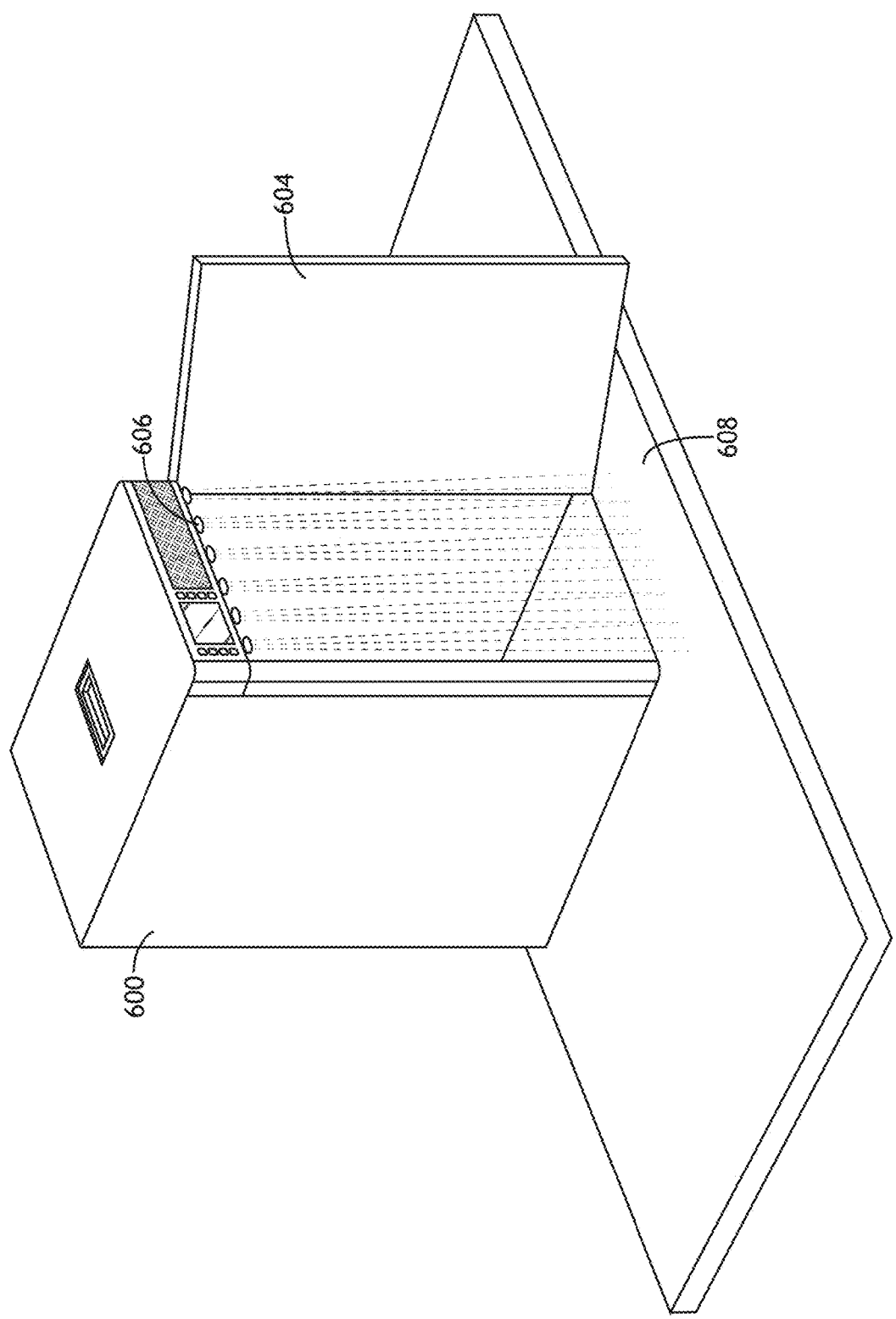
FIG. 6 shows a perspective, environmental view of an appliance according to an exemplary embodiment.

Referring to FIG. 6, a perspective, environmental view of an appliance 600 according to an exemplary embodiment is shown. The appliance 600 may include door sensors for identifying when the door 604 is open. Color changing LEDs 606 disposed in a bottom surface of an upper control panel may be illuminated in a white color at full luminosity when the door sensor detects that the door 604 is open, illuminating the interior of the appliance 600 and the galley work area 608.

Figure 7:
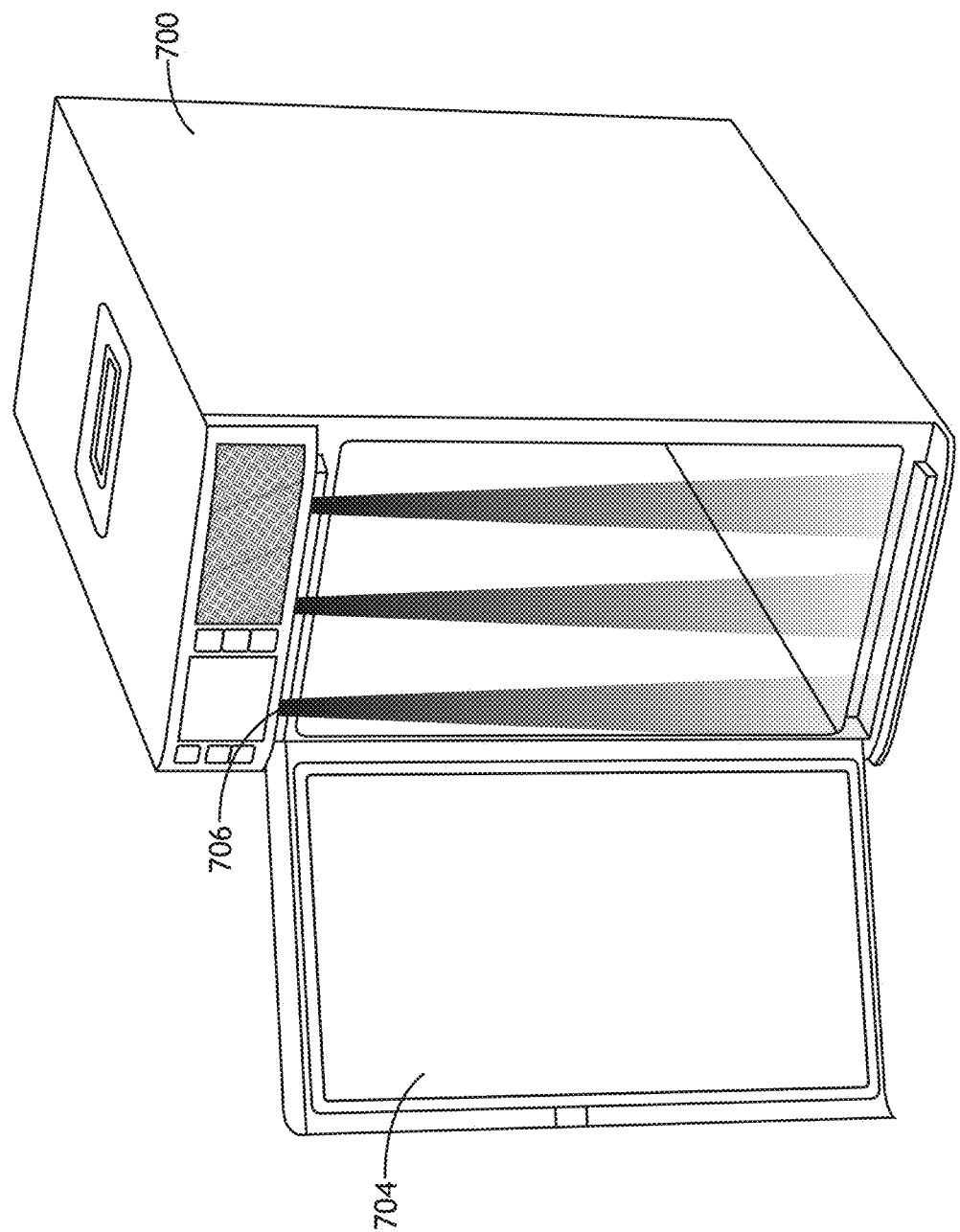
FIG. 7 shows a perspective, environmental view of an appliance according to an exemplary embodiment.

Referring to FIG. 7, a perspective, environmental view of an appliance 700 according to an exemplary embodiment is shown. In at least one embodiment, the appliance is an oven; color changing LEDs 706 in a light strip clearly indicate the status of the oven (stand-by, cooking, ready, off) which the flight attendant may notice from a distance, which is preferable to support the flight attendant. In at least one embodiment, where the galley includes a plurality of ovens, the flight attendant may observe the state of all the ovens at any time.

When opening the door 704, the color changing LEDs 706 automatically change to white/bright light, providing good visibility of the galley work deck and better light inside the oven for inspection, meals check, or cleaning purposes. When not being utilized for operational purposes, the color changing LEDs 706 are useful for back lighting or mood lighting between the frame and oven door 704.

In at least one embodiment, the color changing LEDs further comprise an LCD overlay configured to produce written messages that may be projected by the color changing LEDs as backlights. Such written messages may comprise color coded, detailed feedback; advertisements; operating instructions for the appliance; emergency messages received from remote avionics systems; etc.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A system comprising:
    an appliance door having a diffusely reflective front surface to reflect light into a galley area;
    a plurality of color changing light emitting diodes (LEDs) disposed to illuminate the front surface;
    a datalink connection to one or more other galley appliance systems; and
    at least one processor in data communication with the plurality of LEDs and a memory storing processor executable code for configuring the at least one processor to:
        determine that the system is currently in a state of operation;
        illuminate the LEDS in a first color corresponding to the state of operation;
        determine that the system is currently in a state of completion;
        illuminate the LEDS in a second color corresponding to the state of completion; and
        coordinate an illumination pattern with the one or more other galley appliances systems.

2. The system of claim 1, further comprising a light sensor in data communication with the at least one processor, wherein the at least one processor is further configured to:
    detect a light level via the light sensor; and
    adjust a light level of the LEDs based on the detected light level.

3. The system of claim 1, further comprising a door sensor in data communication with the at least one processor, wherein the at least one processor is further configured to:
    detect when a door is opened via the door sensor; and
    illuminate the LEDs in a third color corresponding to a maximum illumination level when the door is opened.

4. The system of claim 3, further comprising a light sensor in data communication with the at least one processor, wherein the at least one processor is further configured to:
    detect a light level via the light sensor; and
    adjust the maximum illumination level based on the detected light level.

5. The system of claim 1, further comprising a datalink connection between an aircraft system and the at least one processor, wherein the at least one processor is further configured to:
    receive a warning message via the datalink connection; and
    illuminate the color changing LEDs in the first color or a specific warning color, regardless of the current state of the system.

6. The system of claim 1, wherein the at least one processor is further configured to illuminate the color changing LEDs according to defined color codes associated with an on/off button light-ring.

7. An aircraft galley appliance comprising:
    an appliance frame;
    a door having a diffusely reflective front surface to reflect light into a galley area;
    a plurality of color changing light emitting diodes (LEDs) disposed in the appliance frame to illuminate the front surface and illuminate a work area of the appliance when the door is open;
    a datalink connection to one or more other galley appliance systems; and
    at least one processor in data communication with the plurality of LEDs and a memory storing processor executable code for configuring the at least one processor to:
        determine that the system is currently in a state of operation;
        illuminate the LEDS in a first color corresponding to the state of operation;
        determine that the system is currently in a state of completion;
        illuminate the LEDS in a second color corresponding to the state of completion; and
        coordinate an illumination pattern with the one or more other galley appliances systems.

8. The aircraft galley apparatus of claim 7, wherein the plurality of color changing LEDs are disposed on a bottom surface in a control panel of the appliance frame.

9. The aircraft galley apparatus of claim 7, further comprising a light sensor in data communication with the at least one processor, wherein the at least one processor is further configured to:
    detect a light level via the light sensor; and
    adjust a light level of the LEDs based on the detected light level.

10. The aircraft galley apparatus of claim 7, further comprising a door sensor in data communication with the at least one processor, wherein the at least one processor is further configured to:
    detect when a door is opened via the door sensor; and
    illuminate the LEDs in a third color corresponding to a maximum illumination level when the door is opened.

11. The aircraft galley apparatus of claim 10, further comprising a light sensor in data communication with the at least one processor, wherein the at least one processor is further configured to:
    detect a light level via the light sensor; and
    adjust the maximum illumination level based on the detected light level.

12. The aircraft galley apparatus of claim 7, further comprising a datalink connection between an aircraft system and the at least one processor, wherein the at least one processor is further configured to:
    receive a warning message via the datalink connection; and
    illuminate the color changing LEDs in the first color or a specific warning color, regardless of the current state of the system.

13. The aircraft galley apparatus of claim 7, wherein the at least one processor is further configured to illuminate the color changing LEDs according to defined color codes associated with an on/off button light-ring.

* * * * *